Patented May 4, 1954

2,677,699

UNITED STATES PATENT OFFICE 2,677,699

QUATERNARY AMMONIUM SALTS OF OXYGEN CONTAINING STRONG SULFUR ACIDS IN THE CATION OF WHICH THERE ARE NO MORE THAN TWO ARYL GROUPS AND ONE GROUP HAVING A METHACRYLYLOXY SUBSTITUENT

Arthur L. Barney, Wilmington, Del., assignor to E. I. du Pont de Nemours and Company, Wilmington, Del., a corporation of Delaware No Drawing. Application January 21, 1952, Serial No. 267,495

10 Claims. (Cl. 260—486)

This invention relates to a new class of polymerizable vinyl compounds and more particularly to certain monomeric quaternary ammonium vinyl compounds.

Basic addition polymers and copolymers have recently become of industrial significance, particularly since they offer a ready means of preparing shaped objects, e. g., films and fibers, which are readily dyeable, in contrast to the extremely poor dyeability and aqueous processing response exhibited by many synthetic polymers containing no basic groups. More recently, as described, for instance, in the copending application of Barney Serial No. 216,838, filed March 21, 1951, it has been discovered that the quaternary salts of the basic tertiary amino copolymers are particularly outstanding in that they not only exhibit the superior dyeability and aqueous processing response of the basic amino copolymers, but at the same time exhibit a thermal insensitivity only slightly less than the outstanding thermal insensitivity of the polymers containing no basic groups.

One method of preparing these new quaternary copolymers involves the copolymerization of a tertiary amino-containing monomer with the requisite comonomer, followed by after-quaternization of the tertiary amino group with the requisite quaternizing agent. However, this final quaternization step is far from clean-cut or straight-forward since it involves chemical reaction on a polymer. For instance, the control of the amount of basic tertiary amino groups converted to the desired quaternary groups is by no means as good as is desired. Furthermore, any unreacted quaternizing agent, the removal of which is extremely difficult, is quite detrimental to the over-all properties of the polymer, particularly the important thermal stability. Finally, due to the nature of some of the more desirable quaternizing agents, particularly their hydrolytic instability, and in many instances the solubility properties of the starting basic tertiary amino polymers, the quaternization reaction cannot be carried out in aqueous systems and therefore necessitates the use of the more expensive organic solvents which are generally more difficult to remove and, in many instances, because of their potential inflammability, add appreciably to the industrial hazards involved.

This invention has as an object the provision of new polymerizable quaternary ammonium monomers. Another object is the provision of intermediates for polymers and copolymers. Other objects will appear hereinafter.

These objects are accomplished by the present invention of quaternary ammonium salts wherein the quaternary ammonium nitrogen is joined to the anion of an oxygen-containing strong sulfur acid of ionization constant greater than $1 \times 10^{-4}$ and to a monovalent hydrocarbon radical having one substituent and that a 2-methyleneacyloxy radical, the remaining valences of the quaternary nitrogen being satisfied by hydrocarbon radicals with the said quaternary ammonium nitrogen directly bonded to at most two aromatic carbons. Because of the greater availability of the requisite intermediates the 2-methylenealkanoyloxyalkanetrihydrocarboammonium salts of the oxygen-containing strong sulfur acids are preferred. These new quaternary monomers can be readily prepared by quaternization of the requisite 2-methyleneacyloxyhydrocarbodihydrocarbo tertiary amine with the requisite hydrocarbo ester of the necessary oxygen-containing sulfur acid. Suitable acids of ionization greater than $1 \times 10^{-4}$ are: sulfuric acid, sulfurous acid, and the hydrocarbosulfonic acids, e. g., the alkyl-, aryl-, aralkyl-, alkaryl-, and cycloalkylsulfonic acids.

The new polymerizable 2-methyleneacyloxy quaternary ammonium salt monomers of this invention wherein the anion is that of an oxygen-containing strong sulfur acid are readily and easily prepared in high yields and high states of purity. These new quaternary ammonium monomers are readily polymerizable and copolymerizable, particularly with acrylonitrile in conventional addition polymerization systems, including aqueous solutions or dispersions, to give good yields of high molecular weight film- and fiber-forming polymers, particularly the acrylonitrile copolymers which exhibit thermal insensitivities only slightly less than the outstanding thermal insensitivity of polyacrylonitrile and at the same time exhibit superior dyeability and aqueous processing response. In this connection, these new 2-methyleneacyloxy quaternary ammonium salts of oxygen-containing strong sulfur acids are particularly outstanding in comparison with the corresponding halogen quaternary salts since they crystallize so readily and are so much less hygroscopic that they can easily be purified to the extremely high level of purity necessary for successful addition polymerization.

The following examples in which parts are by weight are illustrative of the invention.

EXAMPLE I

*Preparation of beta-methacrylyloxyethyltrimethylammonium cyclohexanesulfonate*

To a stirred solution of 52.5 parts of beta-dimethylaminoethyl methacrylate in about 80 parts of methyl ethyl ketone cooled in an ice/water bath is added under anhydrous conditions over a period of one hour a solution of 59.5 parts of methyl cyclohexanesulfonate in about 80 parts of methyl ethyl ketone. The reaction mixture is held at 32–35° F. for one week and the resultant solid then removed by suction filtration. The product is washed four times with about 200 part portions of anhydrous diethyl ether. After drying there is thus obtained 109 parts (97% of theory) of beta-methacrylyloxyethyltrimethylammonium cyclohexanesulfonate as a white hygroscopic solid melting at 163–165° C.

EXAMPLE II

*Preparation of beta-methacrylyloxyethyltrimethylammonium methylsulfate*

A solution of 31.5 parts of freshly distilled dimethyl sulfate in about 50 parts of anhydrous diethyl ether is added with stirring under anhydrous conditions over a period of two hours to a cooled (ice/water bath) solution of 39.3 parts of beta-dimethylaminoethyl methacrylate in about 350 parts of anhydrous diethyl ether. The reaction mixture is allowed to stand overnight at room temperature and the solid product then removed by filtration. After drying there is thus obtained 59.8 parts (84.5% of theory) of beta - methacrylyloxyethyltrimethylammonium methylsulfate as a white, crystalline, hygroscopic solid. Upon recrystallization from methyl ethyl ketone, there is thus obtained 47.6 parts (80% recovery) of purified beta - methacrylyloxyethyltrimethylammonium methylsulfate.

*Analysis.*—Calculated for $C_{10}H_{21}NO_6S$: N, 4.94%. Found: N, 4.51%, 4.73%.

EXAMPLE III

*Preparation of beta-methacrylyloxyethyltrimethylammonium p-toluenesulfonate*

A solution of 37.2 parts of methyl p-toluenesulfonate in about 140 parts of anhydrous diethyl ether is added slowly with stirring under anhydrous conditions to a cooled (ice/water bath) solution of 31.4 parts of beta-dimethylaminoethyl methacrylate in about 210 parts of anhydrous diethyl ether. The reaction mixture is kept in the ice/water bath for two hours after the addition is complete, then allowed to stand at room temperature overnight. The solid is then removed by filtration and after washing with anhydrous diethyl ether there is thus obtained 40.0 parts of beta-methacrylyloxyethyltrimethylammonium p-toluenesulfonate. Upon standing an additional 15.5 parts of the quaternary deposits in the filtrate. The total 55.5 parts corresponds to 81% of the theoretical yield. The beta - methacrylyloxyethyltrimethylammonium p-toluenesulfonate is a white, crystalline, hygroscopic solid soluble in water, methyl ethyl ketone, acetonitrile, and isopropyl alcohol. Upon recrystallization from ethyl acetate, the purified beta - methacrylyloxyethyltrimethylammonium p-toluenesulfonate is obtained as long white needles melting at 128–129° C.

*Analysis.*—Calculated for $C_{16}H_{25}NO_5S$: N, 4.08%; S, 9.31%. Found: N, 4.08%, 4.11%; S, 9.36%, 9.56%.

EXAMPLE IV

*Preparation of bis-(beta-methacrylyloxyethyltrimethylammonium) sulfate*

An aqueous solution of 3.5 parts of beta-methacrylyloxyethyltrimethylammonium iodide is treated with excess aqueous silver sulfate solution. The white precipitate of silver iodide which forms immediately is removed by filtration and the aqueous solution of the bis-(beta-methacrylyloxyethyltrimethylammonium) sulfate used directly in the preparation of an acrylonitrile copolymer. To the aqueous solution of the bis-quaternary sulfate is added 34.5 parts of acrylonitrile, 0.19 part of ammonium persulfate and 0.38 part of sodium bisulfite and the solution made up to a total of 500 parts with distilled water. The pH of the solution is adjusted to 3.3 by addition of sulfuric acid. The polymerization is started at 25° C. and the temperature allowed to raise spontaneously to 40° C. at which value it is maintained for two hours. After filtration, washing and drying there is obtained 11.2 parts of an acrylonitrile/bis-(methacrylyloxyethyltrimethylammonium) sulfate copolymer as a white powder soluble in dimethylformamide from which solvent strong, self-supporting films exhibiting good receptivity to acid dyes can be solvent cast.

The present invention is generic to 2-methylene acyloxyhydrocarbotrihydrocarboammonium salts of oxygen-containing strong sulfur acids, i. e., to quaternary ammonium salts of oxygen-containing strong sulfur acids in which the four ammonium hydrogens are replaced by hydrocarbon radicals, no more than two of which are aromatic and one of which has one and only one further substituent, and that a 2-methyleneacyloxy radical which is preferably free of active (Zerewitinoff) hydrogen and most preferably solely hydrocarbon other than the single carbonyloxy –(COO)– group. Of the preferred class of the monomers of this invention, i. e., the 2-methylenealkanoyloxyalkanetrihydrocarboammonium salts of the oxygen-containing strong sulfur acids, the most preferred because of the greater availability of the requisite intermediates and also the properties exhibited by the copolymers containing these units in combined form are the 2-methylenealkanoyloxyalkanetrihydrocarboammonium salts of sulfuric and hydrocarbosulfonic acids wherein the various hydrocarbo groups are free of aliphatic unsaturation, i. e., saturated aliphatic, including cycloaliphatic, aromatic, alkaromatic and araliphatic, and preferably of no more than eight carbons each, with at least two of the hydrocarbo groups bonded to the quaternary nitrogens being most preferably saturated aliphatic hydrocarbon of no more than four carbons each, including those compounds wherein two of the monovalent hydrocarbon radicals free of aliphatic unsaturation bonded to the quaternary nitrogen may be together joined to form with said quaternary nitrogen a heterocycle such as, for instance, a piperidyl ring. The new compounds of this invention having a long chain hydrocarbon radical, e. g., up to 18 carbons, on the tertiary amino nitrogen exhibit greater surface active properties both as monomers and in the polymers therefrom. These products, of which a typical example is beta-acrylyloxyethyldimethyloctadecylammonium methylsulfate, are generally more difficult to prepare and purify and for this reason are not preferred although the special surface active properties they possess make them of particular value in specific uses, e. g., in pigment dispersions, corrosion inhibitors.

Particular examples of the preferred compounds include those wherein the 2 carbon carrying the terminal methylene group also carries a single hydrogen, halogen, or monovalent hydrocarbon radical and the hydrocarbon radicals joining the acyloxy group to the quaternary nitrogen and those bonded directly to the quaternary nitrogen are free of aliphatic unsaturation and at least two and most preferably all of the latter have no more than four carbons each, such as beta-acrylyloxyethyltriethylammonium methylsulfate, gamma-acrylyloxypropyethyldibutylammonium p - toluenesulfonate, N - (beta-acrylyloxyethyl) piperidinium methylsulfate; those wherein the 2 carbon carrying the terminal methylenic group also carries a halogen or a hydrocarbon radical, preferably a short chain aliphatic hydrocarbon radical of no more than two carbons, and the various other substituent positions of the molecule are as described above, e. g., beta-methacrylyloxyethyltriethylammonium butylsulfate, gamma - 1-chloroacrylyloxypropyldimethylbenzylammonium m - xylenesulfonate, beta - ethacrylyloxyethylmethylethylcyclohexylammonium ethylsulfate, and the like. In the case of the polyvalent oxygen-containing strong sulfur acids, e. g., sulfuric acid, one or two of the 2-methyleneacyloxyhydrocarbotrihydrocarboammonium radicals may be singly ionically bonded to the polyvalent anion. The compounds of the type wherein only one such quaternary nitrogen is so bonded are illustrated above and in the examples. Included in the latter type of such compounds are the bis - (beta - methacrylyloxyethyltriethylammonium) sulfate of Example IV, and like compounds.

This new class of monomeric quaternary compounds is represented by the following structural formula:

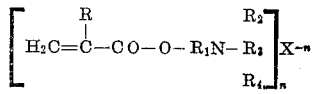

wherein R is hydrogen, halogen, e. g., Cl, or hydrocarbon, and is preferably hydrogen or aliphatically saturated hydrocarbon of no more than two carbons; $R_1$ is a divalent hydrocarbon radical, preferably saturated aliphatic of no more than four carbons; $R_2$, $R_3$, and $R_4$ are similarly hydrocarbon, preferably free of aliphatic saturation and of no more than eighteen carbons apiece with usually at least two and preferably all of said R groups being of no more than eight carbons apiece and most preferably of no more than four carbons apiece, any two of which can be together joined to form with the nitrogen a heterocyclic ring, e. g., a piperidyl ring; X is the negative anion, of valence $-n$, of an oxygen-containing strong sulfur acid, preferably the sulfate or hydrocarbosulfonate anion; and $n$ is an integer from 1 to 2. In those instances wherein $n$ is 1, the single negatively charged anion X is that of a monobasic oxygen-containing strong sulfur acid such as the hydrocarbosulfonic acids, or it is that of a polybasic oxygen-containing strong sulfur acid wherein only one of the ionic charges of the anion is involved in the quaternary linkage, with the remaining charges of the acid anion being satisfied by hydrogen or hydrocarbon radicals, preferably aliphatic hydrocarbon of no more than eight carbons. This latter class of monomers is exemplified by the hydrocarbonsulfates, e. g., the alkanesulfates, such as the methylsulfate or methosulfate type quaternaries discussed above and illustrated in the previous examples.

These new monomers can be prepared in many ways; for instance they can be prepared by simple ionic interchange, using as starting materials the 2-methyleneacyloxyhydrocarbotrihydrocarboammonium salts of the simple monovalent inorganic acids, e. g., the quaternary halides, and reacting such compounds with salts of the oxygen-containing strong sulfur acid involved under ionic conditions. For instance, beta - methacrylyloxyethyltrimethylammonium p-toluenesulfonate can be prepared by reacting beta - methacrylyloxyethyltrimethylammonium chloride with an aqueous solution of sodium p-toluensulfonate. The monomers of the present invention, wherein a polyvalent oxygen-containing strong sulfur acid anion is involved, can be prepared similarly. For instance, bis(-beta-methacrylyloxyethyltrimethylammonium) sulfate can be prepared by reacting two moles of beta - methacrylyloxyethyltrimethylammonium chloride with one mole of sodium sulfate in aqueous solution, or, as illustrated in Example IV, by reacting silver sulfate with the corresponding quaternary iodide. However, since these methods depend upon an anion interchange reaction which may not of necessity always be carried out to successful completion, the monomeric products thereby obtained accordingly may have some unreplaced and undesirable quaternary ammonium units wherein the anion is that of the starting acid.

The simplest and most convenient method for preparing the monomers of this invention involves the direct reaction between the necessary 2-methyleneacyloxyhydrocarbodihydrocarbo tertiary amine and the requisite quaternizing ester of the oxygen-containing strong sulfur acid. This type reaction is not only readily carried out with easily available intermediates, but also avoids any possibility of having present in the monomer any of the less desirable quaternary ammonium monomers of other acids. This quaternization reaction is generally and most conveniently carried out at from 0° C. to room temperature, although lower and higher temperatures, e. g., from −5° C. up to 70° C. or higher can be used. Temperatures above about 40 to 50° C. are generally to be avoided because of the tendency of the monomers to polymerize under such conditions. If it is desirable to operate at an elevated temperature because of increased rate of reaction or other reasons, this tendency to polymerize may be diminished or eliminated by the addition of a conventional polymerization inhibitor that may be removed from the quaternary monomer by crystallization or other means prior to polymerization. The requisite 2-methyleneacyloxyhydrocarbodihydrocarbo tertiary amine and the quaternizing ester of the oxygen-containing strong sulfur acids are usually reacted in essentially equimolar proportions either in bulk or preferably in the presence of an inert solvent.

Slight excesses of either reactant can be used but are generally to be avoided because of the greater difficulty encountered in purifying the products.

The preferred solvents for carrying out the quaternization reaction are those in which the quaternary oxygen-containing strong sulfur acid salt is relatively insoluble, such as, for example, the lower hydrocarbon ethers, e. g., diethyl ether, dibutyl ether; the halogenated hydrocarbons, e. g., the polychlorinated hydrocarbons such as chloroform, carbon tetrachloride, tetrachloroethane, and the like. Generally water is to be avoided in the quaternization reaction because of difficulties encountered in obtaining the desired quaternary monomer in good crystalline form from systems which are at all aqueous. Thus, as illustrated specifically by Example II, a typical quaternary monomer of this invention, e. g., beta-methacrylyloxyethyltrimethylammonium methylsulfate is conveniently prepared by reacting equimolar proportions of dimethyl sulfate with beta-dimethylaminoethyl methacrylate in solution in diethyl ether at room temperature under anhydrous conditions. The quaternization reaction in general appears essentially complete in 48 hours, and the desired beta-methacrylyloxyethyltrimethyl-ammonium methylsulfate separates from the reaction mixture as a white powder which is conveniently removed by filtration and subsequently dried.

The new quaternary monomers of this invention are useful in the preparation of quaternary polymers and copolymers as given in greater detail in the previously identified copending application of Barney. These new quaternary monomers can be polymerized by any of the means previously recognized for the polymerization of addition type monomers, including thermal polymerization as well as polymerization initiated by ionic and free radical type generating catalysts such as the peroxides and hydroperoxides, azo type initiators, the various redox systems, and the like, already well known in the art. Polymerization and copolymerization of these new monomers may be carried out in solution or suspension with the latter, e. g., emulsion polymerization, being preferred.

Suitable examples of the addition polymerizable monomers which may be copolymerized with the members of this new class of quaternary monomers include those addition polymerizable monomers of one ethylenic unsaturation such as olefins, e. g., isobutylene; acrylyl and alkacrylyl compounds, e. g., acrylic, haloacrylic, and methacrylic acids, esters, nitriles, and amides, for example, acrylonitrile, butyl acrylate, methacrylic acid, alpha-chloroacrylic acid, the aminoalkyl acrylates, e. g., beta-diethylaminoethyl methacrylate; vinyl and vinylidene halides, e. g., vinyl chloride, vinylidene chloride, vinyl carboxylates, e. g., vinyl acetate; vinyl aryls, e. g., styrene and other vinyl derivatives such as methyl vinyl ketones, vinylpyridines, vinylisobutylene ethers. The polymers from the monomers of the present invention can contain in combined form polymerizable compounds containing a plurality of ethylenic double bonds including those having conjugated double bonds which are furthermore both terminal ethylenic double bonds such as butadiene, 2-chlorobutadiene, and compounds containing two or more ethylenic double bonds which are isolated with respect to each other, including, for instance, the acrylic and substituted acrylic esters of polyhydric alcohols, e. g., ethylene glycol dimethacrylate; polymerizable compounds having one ethylenic group conjugated with a carboxylic group, e. g., diallyl maleate, and compounds which have not conjugation of the polymerizable ethylenic groups, e. g., divinylsuccinate. The preferred copolymers from the monomers of this invention are those containing in combined form those addition polymerizable monomers having a single terminal methylene group joined by an ethylenic double bond to its neighboring carbon, i. e., compounds containing the terminal group $CH_2=C<$.

The quaternary ammonium monomers of this invention are of use in the preparation of the above-described polymers and copolymers. In the preparation of copolymers the quaternary ammonium monomers of this invention show distinct advantages in allowing careful control of the amount of quaternary units introduced into the polymer, avoiding the presence of any unquaternized tertiary amino units or unreacted quaternizing agent in the polymer, and permitting the preparation of copolymers of better physical properties because of the relatively easy purification of all the component comonomers prior to polymerization. The new quaternary ammonium monomers of this invention are not only useful in the preparation of films and fibers, but they are also useful as bacteristatic agents, humectants, and organic intermediates.

The foregoing detailed description has been given for clearness of understanding only and no unnecessary limitations are to be understood therefrom. The invention is not limited to the exact details shown and described for obvious modifications will occur to those skilled in the art.

What is claimed is:

1. beta - Methacrylyloxyethyltrimethylammonium methyl sulfate.
2. A methacrylyloxyethyltrimethylammonium sulfate.
3. A methacrylyloxyethyltrimethylammonium alkylsulfate in which sulfate the alkyl group is of up to four carbon atoms.
4. A methacrylyloxyethyltrimethylammonium salt of an oxygen-containing strong sulfur acid.
5. A methacrylyloxyalkyltrialkylammonium sulfate in which sulfate each alkyl group is of up to 4 carbons.
6. A methacrylyloxyalkyltrialkylammonium salt of an oxygen-containing strong sulfur acid in which salt each alkyl group is of up to four carbon atoms.
7. A quaternary ammonium salt of an oxygen-containing strong sulfur acid in the cation of which salt the four valences of quaternary nitrogen are satisfied by hydrocarbon radicals of not more than eight carbon atoms each no more than two of which are aryl and only one of which has an alpha-methylenealkanoyloxy substituent of up to four carbon atoms.
8. A quaternary ammonium salt of an oxygen-containing strong sulfur acid in the cation of which salt the four valences of the quaternary nitrogen are satisfied by hydrocarbon radicals of not more than eight carbon atoms each not more than two of which are aryl and only one of which has an alpha-methyleneacyloxy substituent.
9. A quaternary ammonium salt of an oxygen containing strong sulfur acid in the cation of which salt the four valences of the quaternary nitrogen are satisfied by hydrocarbon radicals free from aliphatic unsaturation and of no more than eight carbon atoms each, at least two of which hydrocarbon radicals are saturated aliphatic hydrocarbon radicals of no more than four carbon atoms each, one of which aliphatic hydrocarbon radicals has an alpha-methylenealkanoyloxy substituent of no more than four carbon atoms.

10. A quaternary ammonium salt of an oxygen containing strong sulfur acid in the cation of which salt the four valences of the quaternary nitrogen are satisfied by saturated aliphatic hydrocarbon radicals of no more than four carbon atoms each, one and only one of which aliphatic hydrocarbon radicals has an alpha-methylenealkanoyloxy substituent of no more than four carbon atoms.

References Cited in the file of this patent

UNITED STATES PATENTS

| Number | Name | Date |
| --- | --- | --- |
| 2,103,265 | Scott | Dec. 28, 1937 |
| 2,138,763 | Graves | Nov. 29, 1938 |